Oct. 31, 1933.  C. C. FOSS  1,933,169
OILING DEVICE FOR A ROTARY VALVE
Filed Feb. 13, 1930
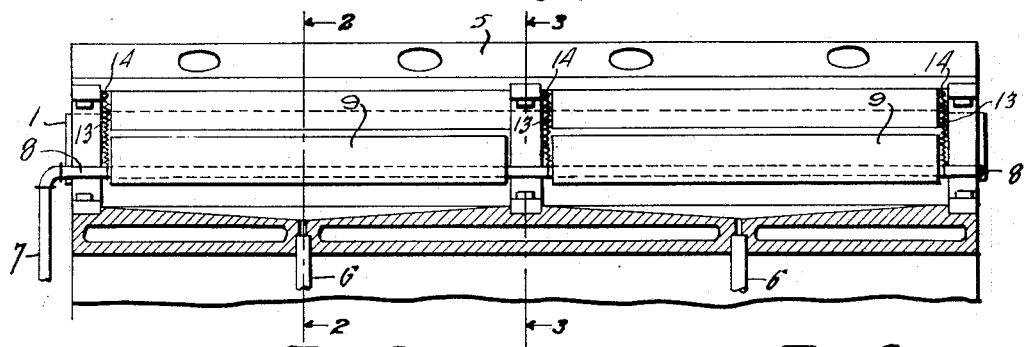
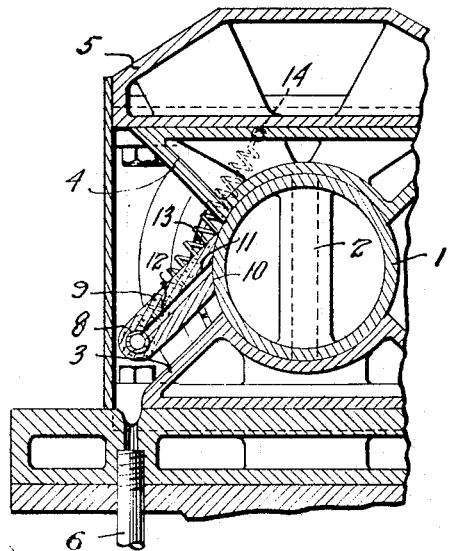
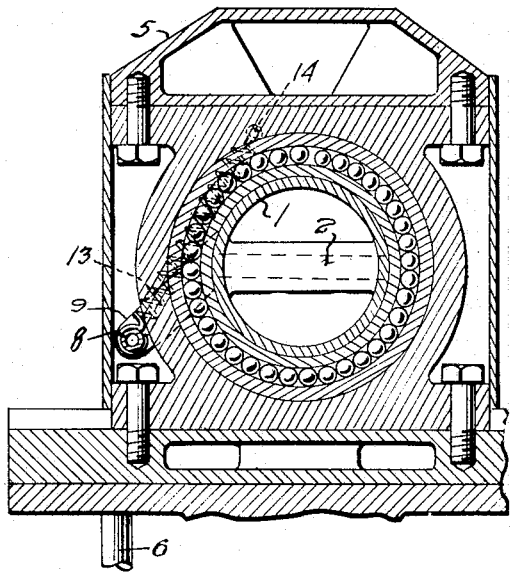
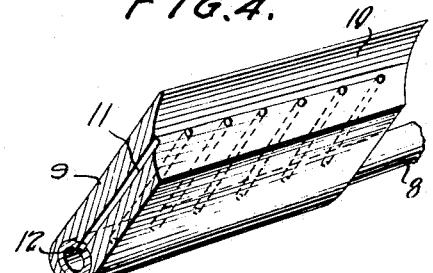

Patented Oct. 31, 1933

1,933,169

UNITED STATES PATENT OFFICE 1,933,169

OILING DEVICE FOR A ROTARY VALVE

Christian C. Foss, Pulaski, Ga.

Application February 13, 1930. Serial No. 428,151

3 Claims. (Cl. 184—14)

The object of my invention is to provide a novel oiling device for a rotary valve which will keep the valve properly oiled at all times. It is also an object of my invention to provide an oiling device for rotary valves which can be manufactured at small cost and which is simple and efficient in operation.

I attain these and other objects of my invention by the device illustrated in the accompanying drawing, in which,—

Figure 1 is a front elevation of my oiling device applied to a rotary valve;

Fig. 2 is a transverse section through the rotary valve and oiling device and a portion of the cylinder head in which the rotary valve is mounted, on the line 2—2 of Fig. 1;

Fig. 3 is a section on line 3—3 of Fig. 1; and

Fig. 4 is a detail perspective view of a portion of the oiling device, the end being shown in section.

Like numerals designate like parts in each of the several views.

Referring to the accompanying drawing, there is illustrated a rotary valve 1 having ports or passages 2 therethrough. The rotary valve is positioned between a bottom bearing 3 and a top bearing 4 in which it rotates. These bearings in turn are mounted in the cylinder head 5, as illustrated in Figs. 2 and 3. I provide a suitable oil drain pipe 6 from the cylinder head 5, as shown in Figs. 1 and 3, and a suitable oil supply pipe 7 which communicates with the channel 12 of hollow shaft 8. Affixed to the hollow shaft 8 I provide a plurality of oil distributor sections or stacks of like shape and size, each of which wipes the surface of the rotary valve, the edge surfaces 10 of the oil distributors being curved in cross section, as shown in Fig. 4, to seat closely on the surface of the rotary valve. I provide suitable oil passages 11 through the oil distribtor or stack, as shown in Fig. 4, to facilitate the distribution of oil to the outer suface of the rotary valve.

The beveled and curved surfaces 10 of the stacks or oil distributor sections 9 function to prevent seeping of oil into the ports of the rotary valve when the valve is not in motion, inasmuch as the main body of oil is below the surfaces 10, and when operation of the machine is suspended the oil flows by gravity back down the stack and not into ports 2; and also function to evenly distribute the oil when the valve is in operation. This member 9 may be of fiber or other suitable substance to permit the oil to gradually flow through the substance for the purpose of lubricating the rotary valve while in motion. As the oil is forced in from the lower end of the oil distributor and up through the channels 11 through the fiber or like substance the oil is distributed over the surface 10 and onto the surface of the rotary valve which it wipes. The oil distribtuor or stacks 9 are freely supported on hollow shaft 8 which shaft is supported by springs 13, and the distribtor or stacks being disposed in a slanting position their free edges are held continuously in contact with the rotary valve by gravity. The hollow shaft 8 on which the oil distributors or stacks are mounted rests solidly on the cylinder head proper. Three coil or other suitable springs 13 function to hold the stacks in operative contact with the rotary valve. A spring is provided at each end of the hollow shaft, the spring in turn being fastened to any suitable fastening means on the upper central portion of the cylinder head or other stationary element. A similar spring is affixed to the central portion of the hollow shaft and to a fastening element on cylinder head 5. The hollow shaft and oil distributor members are resiliently supported by the three springs above described.

This invention may be applied to any type of engine carrying a rotary valve.

What I claim is:

1. In an oiling device for a rotary valve, the combination of a hollow shaft disposed parallel with and laterally of the rotary valve, springs arranged laterally of the rotary valve for resiliently supporting the hollow shaft, and a series of slantingly disposed channeled oil distributor members affixed to the shaft and having their free edges loosely contacting by gravity with the rotary valve, the free edges of the oil distributor members being curved to seat snugly on the rotary valve.

2. In an oiling device for a rotary valve, the combination of a hollow shaft disposed parallel with and laterally of the rotary valve, and a series of slantingly disposed channeled oil distributor members affixed to the shaft and having inwardly curved free edges loosely contacting by gravity due to the slanting position of the distributor members with the rotary valve, the oil distributor members having channels extending from the hollow shaft to the edge which contacts with the rotary valve to distribute oil thereon.

3. In an oiling device for a rotary valve, the combination of a hollow shaft, a series of channeled oil distributor members affixed to the hollow shaft disposed in a slanting position to engage the rotary valve, the edge surfaces of said oil distributor members having their free edges curved to seat snugly on the rotary valve, springs resiliently supporting the hollow shaft, the slanting and offset position of the distributor members relative to the aforesaid hollow shaft causing them to seat on the rotary valve by gravity.

CHRISTIAN C. FOSS.